United States Patent [19]

Nakayama et al.

[11] Patent Number: 5,790,901
[45] Date of Patent: Aug. 4, 1998

[54] CAMERA INCLUDING A ZOOM LENS HAVING SIMULTANEOUS FOCUSING AND ZOOMING

[75] Inventors: Haruki Nakayama; Satoshi Nakamoto; Yuichi Honda, all of Hachioji, Japan

[73] Assignee: Konica Corporation, Tokyo, Japan

[21] Appl. No.: 534,860

[22] Filed: Sep. 26, 1995

[30] Foreign Application Priority Data

Sep. 29, 1994 [JP] Japan .................... 6-235474

[51] Int. Cl.$^6$ .................................. G03B 1/18
[52] U.S. Cl. .................................. 396/82
[58] Field of Search ................. 396/72, 79, 80, 396/81, 82; 359/676, 683, 684, 685

[56] References Cited

U.S. PATENT DOCUMENTS 5,144,493  9/1992  Nomura.
5,461,443  10/1995 Nakayama et al. .......... 396/89

FOREIGN PATENT DOCUMENTS 63-46583  9/1989  Japan.
5104456  11/1994  Japan.

Primary Examiner—Howard B. Blankenship
Attorney, Agent, or Firm—Finnegan, Henderson, Farabow, Garrett & Dunner, L.L.P.

[57] ABSTRACT

A camera having a zoom lens in which the zoom lens includes: first and second lens components for focusing the light from an object on the focal plane; a lens barrel for guiding movements of the first and the second lens components, in which the lens barrel includes a first guide portion for guiding movement of the first lens component and a second guide portion for guiding movement of the second lens component; and a moving driver for moving the first lens component along the first guide portion and for moving the second lens component along the second guide portion so that the first and the second lens components focus the light on the focal plane at plural focal lengths, and a focal point adjustment, including focusing and focusing compensation, is conducted continuously from the first focal length to the second focal length of the plural focal lengths.

6 Claims, 14 Drawing Sheets

CAMERA INCLUDING A ZOOM LENS HAVING SIMULTANEOUS FOCUSING AND ZOOMING

BACKGROUND OF THE INVENTION

This invention is related to a zoom lens barrel which holds a zoom lens as a photographic lens of a camera.

Recently, it became common to use a zoom lens as a photographic lens in the field of lens-shutter cameras and single-lens reflex cameras. The zoom lens is a lens capable of changing its focal length or magnification. There is a keen competition of technologies to maximize the magnification ratio, which is the ratio of the longest focal distance to the shortest focal distance, of the zoom lens and to minimize the size of the zoom lens barrel. The technology to maximize the magnification ratio is contrary to that to minimize the size; however, there are different kinds of proposals of zoom lens barrels which do not increase the barrel size in a high magnification ratio.

For one example of the proposals, a zoom lens barrel is disclosed in Japanese Patent Publication Open to the Public Inspection No. 259210/86, and the applicant of the present invention disclosed a zoom lens barrel in Japanese Patent Publication Open to the Public Inspection No. 226562/94. Although the conventional zoom lens barrels realize the focal length variation or zooming and the focal point control or focusing with respective mechanisms, in the above-mentioned disclosure, zooming and the focusing are both realized with the same mechanism so that a remarkably small zoom lens barrel can be configured.

In the above-mentioned disclosure, so called step zoom method, in which predetermined number of focal length steps are provided between the longest focal length and the shortest forcal length, is used. The step zoom method will be explained with a figure showing zooming characteristics in FIG. 1. In the figure, the horizontal axis indicates the variation of the focal length, W indicates the case that the focal length is set at the shortest, $M_1$ and $M_2$ indicate the cases that the forcal length is set gradually longer, and T indicates the case that the focal length is set at the longest. Therefore, there are four steps to change the focal length in zooming. The vertical axis indicates the moving amounts of the front and rear components of the zoom lens in the optical axis. The front component a helicoidally coupled with a rotatable cam barrel so that the front component linearly moves as the lens frame rotates. On the other hand, the rear component is driven by the cam which is engraved on the cam barrel as a guide portion to move the lens component. The cam is arranged so that the photographing distance U is varied as a continuous wedge shape between ∞ (the infinite distance) and N (the shortest distance). For example, when the focal length is set at W and focusing is conducted, the front and rear components move between W and ① according to the photographing distance. When zooming is conducted to shift one step to the telephoto side, the front and rear components move to the position of $M_1$ through the position of ①. As in the same manner, when zooming is conducted to shift two steps to the telephoto side, they move to the position of $M_2$ through the positions of ①, $M_1$, and ②. As explained, the zoom lens is configured so that the movements of the front and rear components alternatively conduct focusing and zooming; therefore, the mechanism for focusing and the mechanism for zooming are unitedly configured so that the number of parts is reduced and the zoom lens barrel can be configured small.

The invention, according to the above-explained disclosure, is remarkably effective for the minimization of the zoom lens barrel and the camera, to which the invention is applied, has been brought into production. However, the zoom lens used in the product camera is of two magnifications. If the invention is applied to a camera having a zoom lens of a higher magnification than two magnifications, there are disadvantages in the configuration.

It is necessary to provide more steps as a zoom lens of a higher magnification is used in order to use the characteristics of the high magnification ratio to advantage. An enlarged figure of zooming characteristics is shown in FIG. 2. When the focal length is set at $M_W$ and focusing is conducted in the same manner as the one previously explained, the rear component moves between ① and ②. Next, when zooming is conducted to shift one step to the telephoto side, the rear component moves to ③ through ① and ② so that the focal length becomes $M_T$. In this figure of zooming characteristics, the number of zooming steps is supposed to be increased by using a zoom lens of a high magnification ratio and the focal length $M_M$ is provided between $M_W$ and $M_T$. If zooming is conducted to shift one step from $M_W$, the rear component moves to ④ through ② so that the focal length becomes $M_M$. According to the figure, as it is easily understood, when the angle $\theta_1$ between ② and ③ is compared with the angle $\theta_2$ between ② and ④, the angle $\theta_2$ is larger than $\theta_1$; therefore, the mechanical stress on the movement of the rear component is increased and the movement of the rear component may be difficult if the angle is too steep.

Therefore, it is necessary to elongate the step interval in order to make the angle $\theta_2$ smaller and the movement of the rear component easier. However, if the step interval is elongated in relation to the horizontal axis of the figure, a circumferential length of the cam barrel, which forms a cam, or a diameter of the cam barrel becomes larger; therefore, it results in a large lens barrel.

SUMMARY OF THE INVENTION

In accordance with above-mentioned problems, the present invention provides a zoom lens barrel in which: there is no enlargement of a circumferential length or a diameter of the cam barrel and there is no increase of mechanical stress even if a number of steps is increased as the magnification ratio is increased.

The above-mentioned problems are solved by a zoom lens of a camera according to the present invention. The zoom lens includes: first and second lens components; a lens barrel having first and second guide portions; moving means to move the first and the second lens components, in which the first guide portion guides the movement of the first lens component and the second guide portion guides the movement of the second lens component. Further, in the second guide portion, it is configured that a focal point adjustment is conducted continuously from the first focal length to the second focal length, which is different from the first focal length. The moving means moves the first and the second lens components respectively along the first and the second guide portions so that the focal point adjustment is conducted at different focal lengths.

BRIEF DESCRIPTION OF THE DRAWINGS

FIGS. 5(A) and 5 (B) are the composition explanations of the fixing plate of the zoom lens barrel.

DETAILED DESCRIPTION OF THE INVENTION

Figure 15:
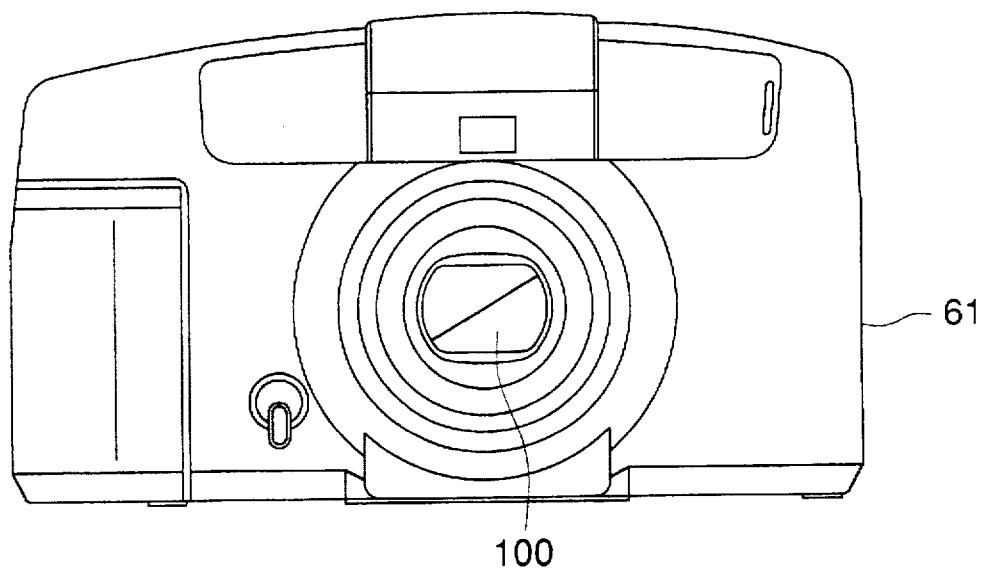
FIG. 15 is the front view of the main body of the camera

FIG. 15 is an outside view of a camera according to the present invention, and 100 shows an outside view of its zoom lens. Further, an example of the barrel of the zoom lens will be explained in detail by referring FIGS. 3 through 5.

Figure 3:
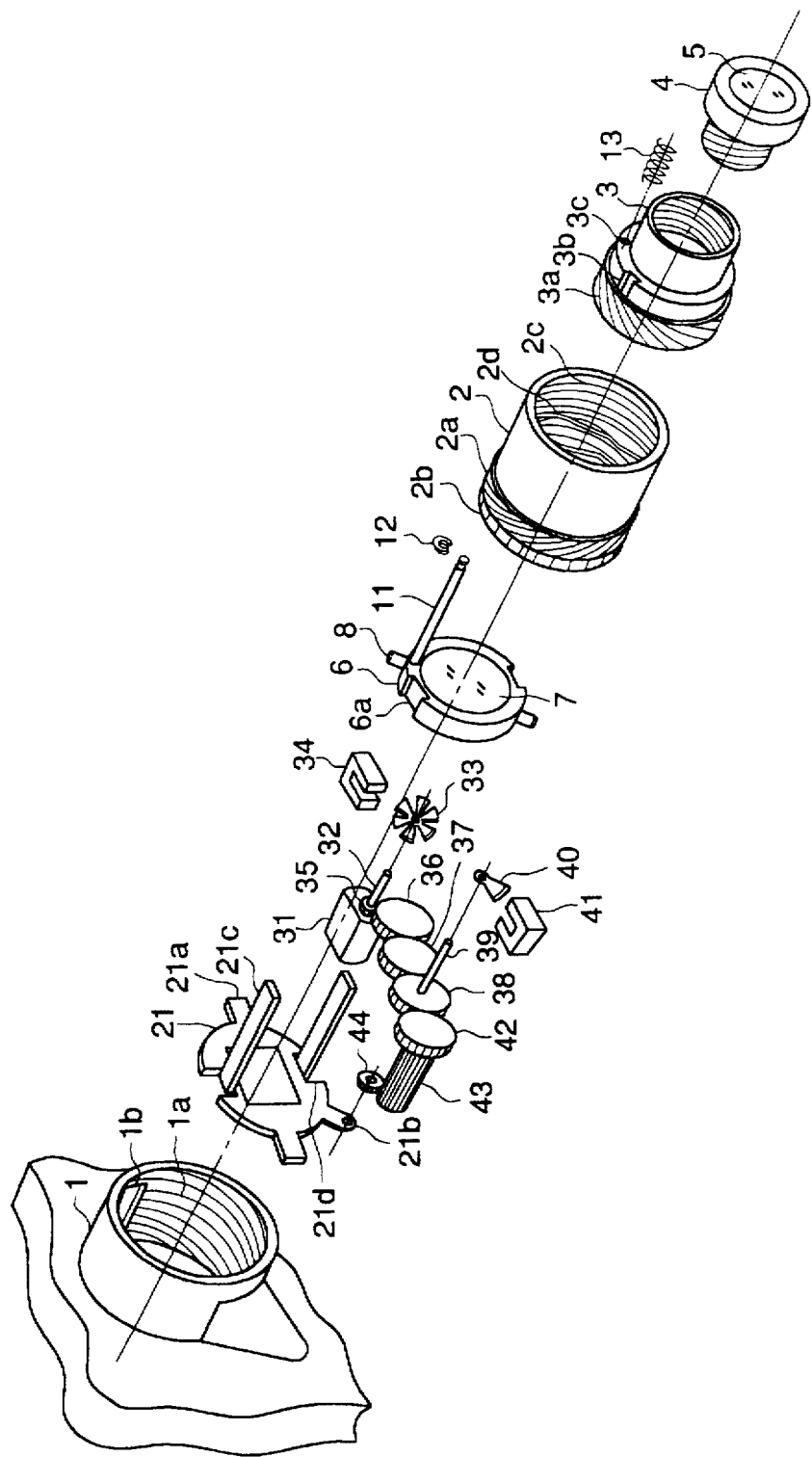
FIG. 3 is the decomposed perspective view of the zoom lens barrel according to the present invention.
Figure 4:
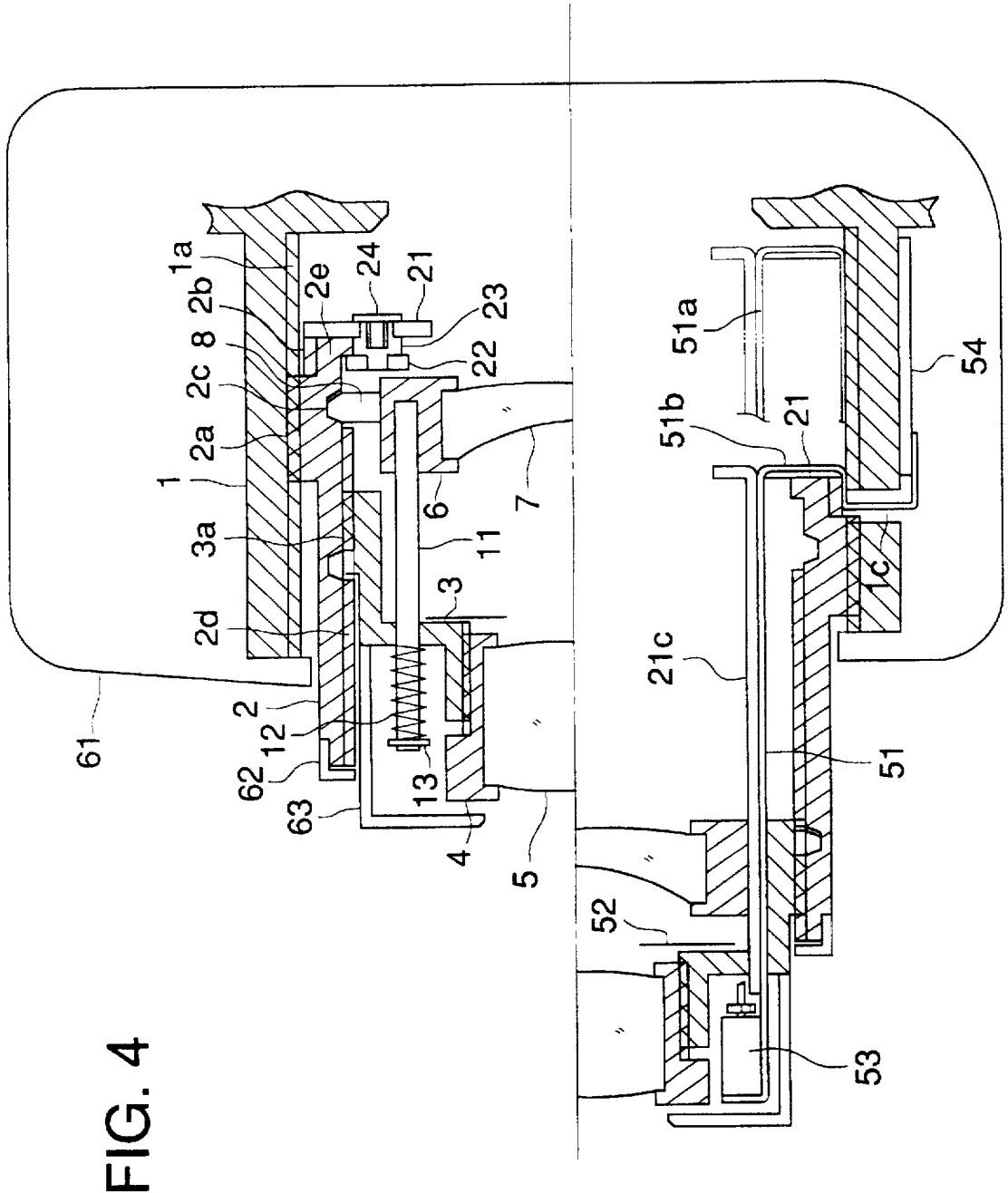
FIG. 4 is the horizontal cross sectional view of the zoom lens barrel.
Figure 5:
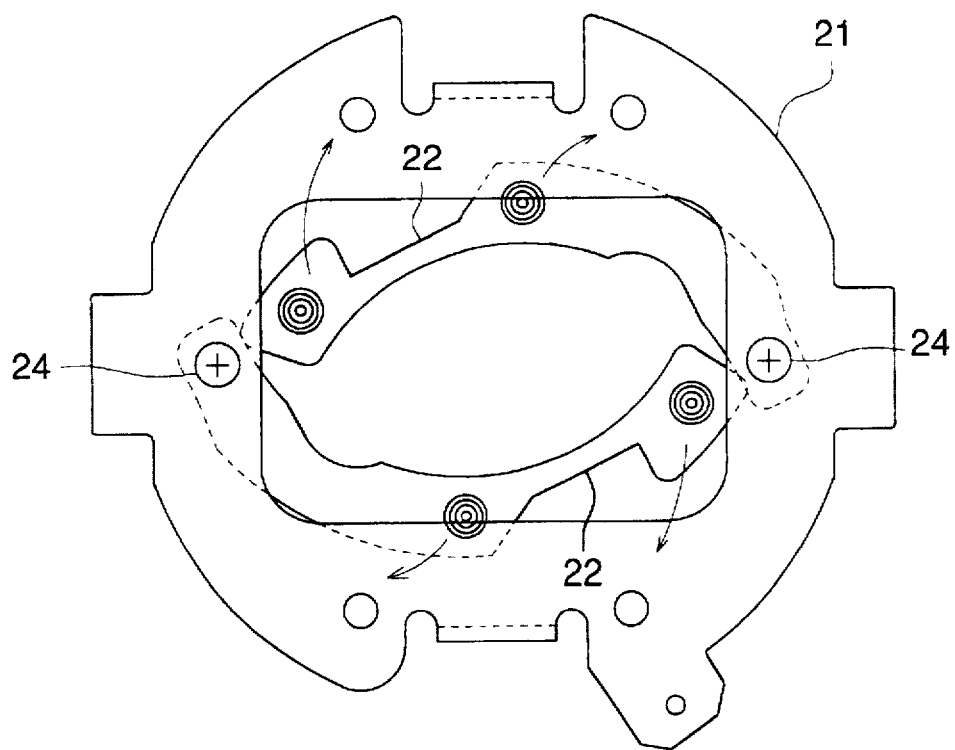
Figure 5:
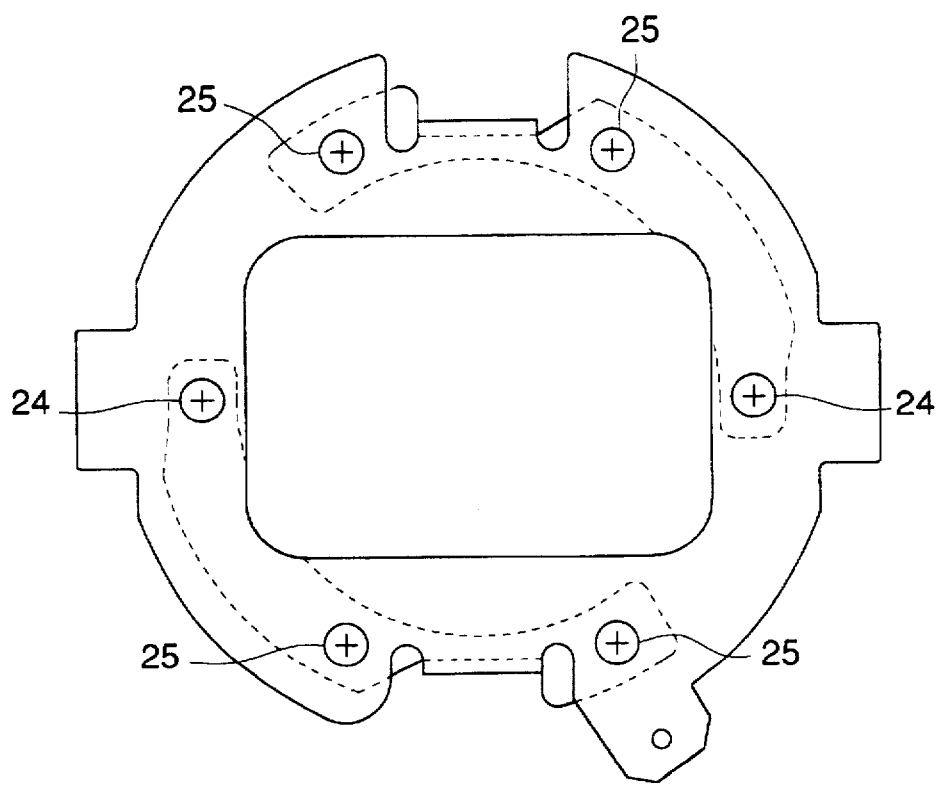

FIG. 3 is a decomposed perspective view of the zoom lens barrel according to the present invention. FIG. 4 is a horizontal cross sectional view of the zoom lens barrel in which the upper half of the barrel shows the position of the lens at a wide angle focal length and the lower half of the barrel shows that at a telephoto focal length. FIG. 5 is a composition explanation of the fixing plate.

1 is a fixed barrel which is uniformly fixed to the main body of a camera on the inner surface of fixed barrel 1, female helicoid 1a is provided and guide grooves 1b, for linear guide 21 which will be explained later, are provided at both right and left hand sides of female helicoid 1a in the manner that guide grooves 1b are across female helicoid 1a. 2 is a cam barrel in which male helicoid 2a, which couples with female helicoid 1a, and large gear 2b are uniformly provided on the outer surface, first helical guide portion or female helicoid 2c and second guide portion or cam groove 2d, which is an inner cam, are provided on the inner surface, and rib 2e is provided at the inner rear end. The outer diameter of large gear 2b is formed smaller than the inner diameter of male helicoid 2a so as to minimize the barrel size. If cam barrel 2 and large gear 2b are uniformly made of resin, it is possible to form it with a uniform mold of one way withdrawal without providing separate molds; therefore, a high precision part is produced with a simple configuration mold.

3 is a front component sliding frame in which front component lens frame 4, for holding front component lens 5 of a positive composite focal length, is fixed with screws from its front side. The manufacturing size error of lens-related parts is compensated by arranging the fixing place of the screws. On the outside circumferential surface of front component sliding frame 3, there are provided male helicoid 3a, which is coupled with female helicoid 2c, guide groove 3b, for linear guide 21 which will be explained later, and a hole 3c for guide shaft 11 which will be explained later. 6 is a rear component sliding frame in which rear component lens 7 of a negative composite focal length is held with the inner circumferential surface. The rear component sliding frame 6 is provided with guide groove 6a, for linear guide 21 which will be explained later, and rear component cam pin 8 which is coupled with cam groove 2d, and guide shaft 11 is protruded on the front side. 13 is a shaft spring which is inserted into guide shaft 11. 12 is a E-shaped fixing ring for preventing shaft spring 13 from being displaced. 21 is a linear guide which is slidablly coupled with guide groove 1b of fixed barrel 1 with protrusion 21a. Linear guide 21 also rotatably supports driving gear 44, which will be explained later, with another protrusion 21b, and is slidably coupled with guide grooves 3b and 6a with arm 21c which is bent toward the front side. 22 is a guide fixing plate which couples cam barrel 2 to linear guide 21. 23 is a guide fixing shaft which couples linear guide 21 to guide fixing plate 22 and holds cam barrel 2 with rib 2e. 24 is a fixing screw for fixing linear guide 21 to guide fixing shaft 23.

31 is a barrel driving motor in which propeller 33 is attached to shaft 32 so that continuous pulse signals, indicating the movement of front component lens 5 and rear component lens 7, are obtained from photo-interrupter 34. 35 is a pinion directly connected to the motor. The rotation of barrel driving motor 31 is transferred to the fifth gear, having a long body in an optical axis direction, through first gear 36, second gear 37, third gear 38, and fourth gear 42, and the rotation is further transferred to the driving gear 44. Driving gear 44 is coupled with large gear 2b of cam barrel 2. Propeller 40 is attached to shaft 39 of third gear 38, and discontinuous pulse signals, indicating the movement of front component lens 5 and rear component lens 7, are obtained from photo-interrupter 41. The interval of the discontinuous pulse signals is set longer than that of the pulse signals generated from photo-interrupter 34.

52 is a shutter and 53 is a shutter driving motor which is mounted on front component sliding frame 3. 51 is FPC circuit board which connects shutter driving motor 53 to printed circuit board 54, on which electric parts of the main body are assembled. FPC circuit board 51 is connected with shutter driving motor 53, wired to a back side of the camera through a space between arm 21c of linear guide 21 and the inner circumferential surface of cam barrel 2, returned at the back side end of cam barrel 2, and further wired to a front side of the camera through a space between the outer circumferential surface of cam barrel 2 and fixed barrel 1. Hole 1c is provided on fixed barrel 1 at a position where it is closer to the front side of the camera than the end side of cam barrel 2 when cam barrel 2 is moved forward to the maximum position. FPC circuit board 51 is connected to printed circuit board 54 at the main body side by wired through hole 1c and on the outer circumferential surface of fixed barrel 1. 51a shows FPC circuit board 51 at the position that the lens barrel is shrunk to the minimum length. 61 is an outside shape of the camera, decoration ring 62 is attached to cam barrel 2, and front barrel 63 is attached to front component sliding frame 3.

Next, the basic motion of the zoom lens barrel will be explained.

In the zoom lens barrel according of the present example, there are provided plural portions in which suspension control of lens driving for focusing is conducted within a zooming portion in prior techniques. Front component lens 5 and rear component lens 7 are driven by the same mechanism, and thereby zooming and focusing are conducted. Therefore, in case that zooming or focusing is conducted, driving motor 31 drives in response to the signals not shown, the driving force is transferred to fifth gear 43 through the chain of gears 35, 36, 37, 38, and 42, and fifth gear 43 transfers the driving force to driving gear 44 which is furnished with linear guide 21. Driving gear 44 is coupled with large gear 2b so as to rotate cam barrel 2; thereby, cam barrel 2, which is coupled with fixed barrel 1 through a helicoid portion, is moved in an optical axis direction. Here, cam barrel 2 is moved forward or backward in the optical axis direction depending on the rotation direction of driving motor 31. On rib 2e of cam barrel 2, linear guide 21 is uniformly attached by guide fixing plate 22, guide fixing shaft 23, and fixing screw 24; however, linear guide 21 is prevented from being rotated by protrusions 21a at both sides and guide groove 1b of fixed barrel 1 so as to be moved only in the optical axis direction. In the same manner, front component sliding frame 3 is prevented from being rotated by guide groove 3b and arm 21c of linear guide 21. Further, rear component sliding frame 6 is also prevented from being rotated as well as front component sliding frame 3 because guide shaft 11, which is protruded from rear component sliding frame 6, goes through front component sliding frame 3. Therefore, when cam barrel 2 is rotated, front component sliding frame 3, which is coupled with cam barrel 2 through a helicoid portion, and rear component sliding frame 6, which is coupled with cam barrel 2 through a cam are moved forward or backward in the optical axis direction.

Cam groove 2d of cam barrel 2 is formed in the manner that a groove, having an angle smaller than a leading angle of female helicoid 2c, and a groove, having an angle larger than the leading angle, are alternatively provided so that rear component sliding frame 6 moves in a discontinuous wedge-shaped path while front component sliding frame 3 moves in a linear path by helicoid. This will be explained in detail later with a figure of zooming lines; however in summary, driving for focusing and zooming is realized by the same mechanism because plural focusing portions are provided within a zooming portion.

With the movement of cam barrel 2, the coupling position of fifth gear 43 and driving gear 44 is moved in the optical direction; however, coupling of the two is kept no matter how much cam barrel 2 moves since fifth gear 43 has a long body in the optical direction. Further, rib 2e of cam barrel 2 has a function of supporting cam barrel 2, in rotation, with the inner circumferential surface of rib 2e in addition to a function of preventing linear guide 21 from its removal by a thrust. Therefore, rib 2e prevents cam barrel 2 from being deformed when cam barrel 2 transfers driving force.

The condition, that linear guide 21 and guide fixing plate 22 are assembled, will be explained by referring FIGS. 5(A) and 5(B). In FIG. 5(A), for effective assembling, two pieces of fixing plates 22 are temporally fixed to linear guide 21 respectively with fixing screws 24. Linear guide 21 is assembled into cam barrel 2 from the back side of the camera; then, fixing plates 22 are rotated on fixing screws 24 as axes in a clockwise direction. Fixing plates 22 are coupled with linear guide 21 with six fixing screws 24 and 25 as shown in FIG. 5(B). In this manner, it is possible that linear guide 21 functions, as a single part, to guide cam barrel 2 and front component sliding frame 3; therefore, linearity of front component sliding frame 3 is high and effectivity of driving force for linear movement is high.

Figure 6:
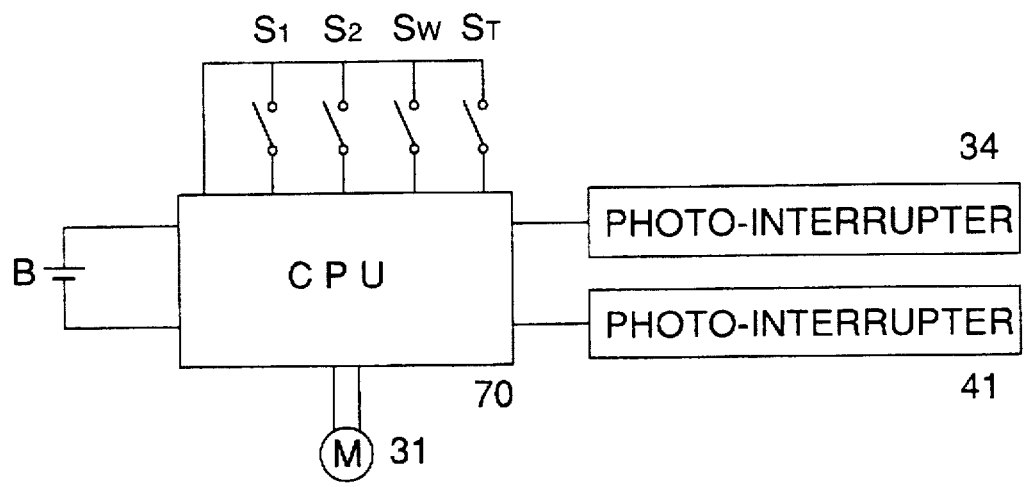
FIG. 6 is the block diagram of the camera having the zoom lens barrel.
Figure 7:
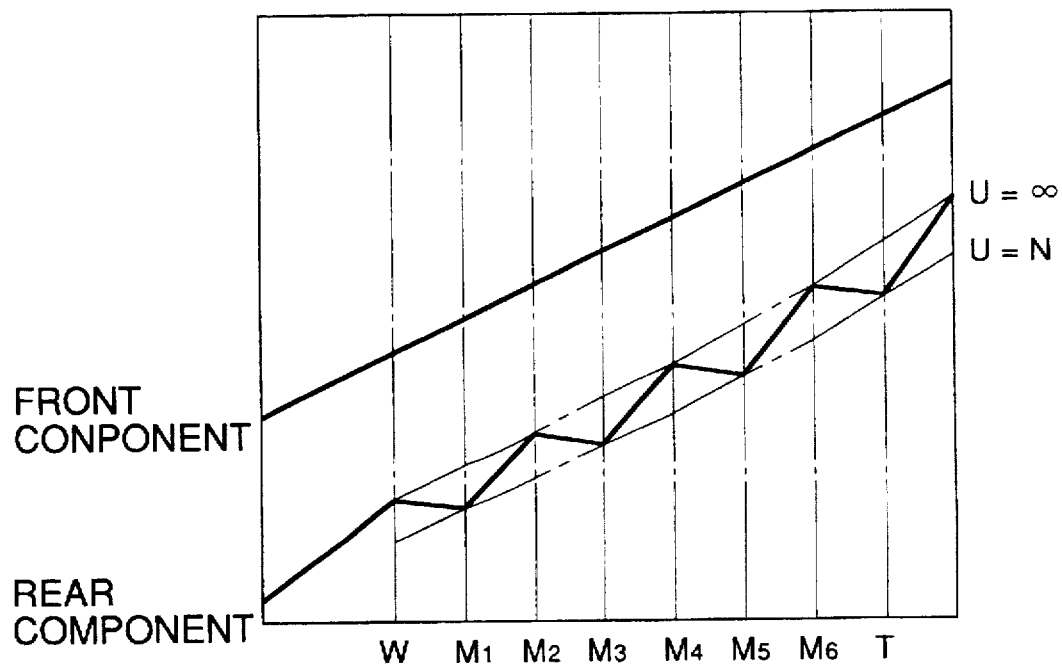
FIG. 7 is the figure of zooming lines which divides the range of focal lengths to eight steps.

FIG. 6 is a block diagram of the present example and explains the motions of a photographic lens with the figure of zooming lines in FIG. 7.

FIG. 7 shows zooming lines in which focal length variation is divided to eight steps. horizontal axis shows the variation of focal length, and vertical axis shows the movement of the front and rear components of the photographic lens in their optical axis direction. The front component moves linearly by helicoid drive, the rear component moves repeatedly alternatively in a direction to be further from the front component and in a direction to be closer to the front component by the cam of cam barrel 2.

For example, in case that focal length is W, CPU 70 detects pulse signals generated from photo-interrupter 41 by the predetermined rotation of barrel driving motor 31 and CPU 70 stops the front and rear component, which are moving from the position of the focal length W, at the position of the focal length $M_1$ when zoom button $S_T$ is pressed and one step of zooming is conducted to the telephoto side. If one more step of zooming is conducted, the position of focal length is shifted from $M_1$ to $M_2$.

Hereinafter, the motion in zooming will be explained in detail.

When signal $S_T$ is inputted to CPU 70 by pressing zooming button $S_T$ at the position of focal length W, CPU 70 controls barrel driving motor 31 to rotate in the normal direction so that front component lens 5 and rear component lens 7 are moved by the chain of gears 35 through 44 and propeller 40 is rotated. If signals from photo-interrupter 41 to CPU 70 vary when propeller 40 runs through photo-interrupter 41, CPU 70 controls barrel driving motor 31 to stop its rotation so as to stop front component lens 5 and rear component lens 7 at the position of focal length $M_1$.

If zooming button $S_T$ is further pressed, it is possible to stop the lenses at the position of one of the focal lengths $M_2$ through T as in the same manner explained above.

When lens components are at the position of one of the focal length $M_1$ through T and signal $S_W$ is inputted to CPU 70 by pressing zooming button $S_W$, CPU 70 controls barrel driving motor 31 to rotate in the reverse direction. As in the same manner explained above, when signals from photo-interrupter 41 to CPU 70 vary, it is possible that CPU 70 controls barrel driving motor 31 to stop its rotation so as to stop the lenses at the position of one of the focal lengths W through $M_6$.

As explained above, it is possible to conduct zooming of eight steps between the focal lengths of W and T in this example.

On the other hand, when the focal length is W for example, ranging information, generated from auto-focusing circuit (not shown), is inputted into CPU 70 when switches $S_1$ and $S_2$ are turned on by pressing a release button. CPU 70 sets a predetermined number of pulses according to the ranging information and the zooming position (W, $M_1$ through $M_6$, and T) CPU 70 controls barrel driving motor 31 to rotate in the normal direction, to drive front component lens 5 and rear component lens 7 through the chain of gears 35 through 44, and to rotate propeller 33 so that pulse signals are inputted into CPU 70 from photo-interrupter 34 and the pulse signals are counted. When the pulse count achieves to the predetermined pulse number, barrel driving motor 31 is stopped and focusing is conducted. Then, shutter (not shown) is driven and exposure to a photographic film is conducted. After the exposure is finished, barrel driving motor 31 is rotated in the reverse direction, the predetermined pulse number is counted, and barrel driving motor 31 is stopped when the lenses are returned to the original zooming position.

When the focal length is $M_1$, focusing, by which focal point can be between the minimum focal distance and the infinity, is conducted while the front and rear components are moved in the portion between $M_1$ and $M_2$.

As explained above, focusing in the present example is conducted by one way rotation of barrel driving motor 31 at any of the portions. This is because the magnification change of a finder is synchronized with that of photographing lens and back-lashes of cams and driving gears are absorbed.

The rotation direction of motor 31 for focusing can be one way rotation in the opposite direction of that of this example in any of the portions.

Therefore, in this figure of zooming lines, zooming is performed by repeatedly changing the focal length step-wise between a focal length with the focus of the infinity and a focal length with the focus of the minimum focal distance so that focusing is conducted in all steps of the zooming portion between W and T.

Figure 1:
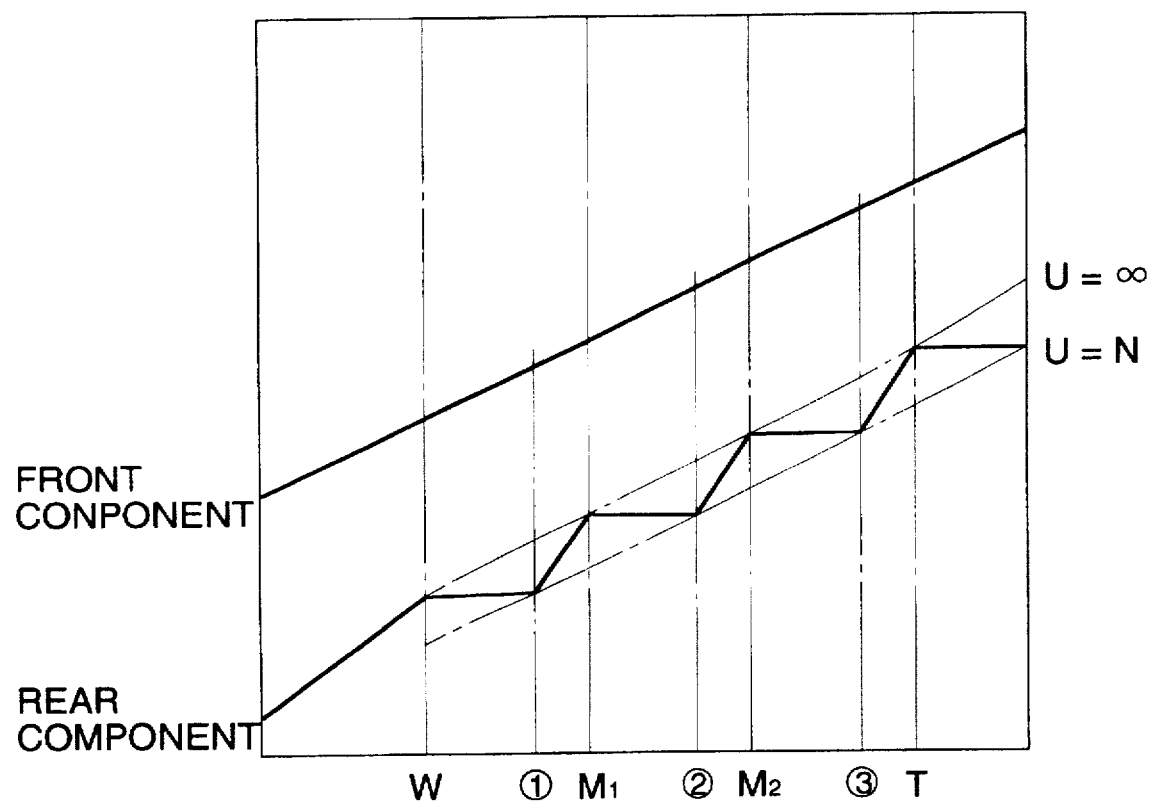
FIG. 1 is the figure of zooming lines according to the conventional techniques.
Figure 2:
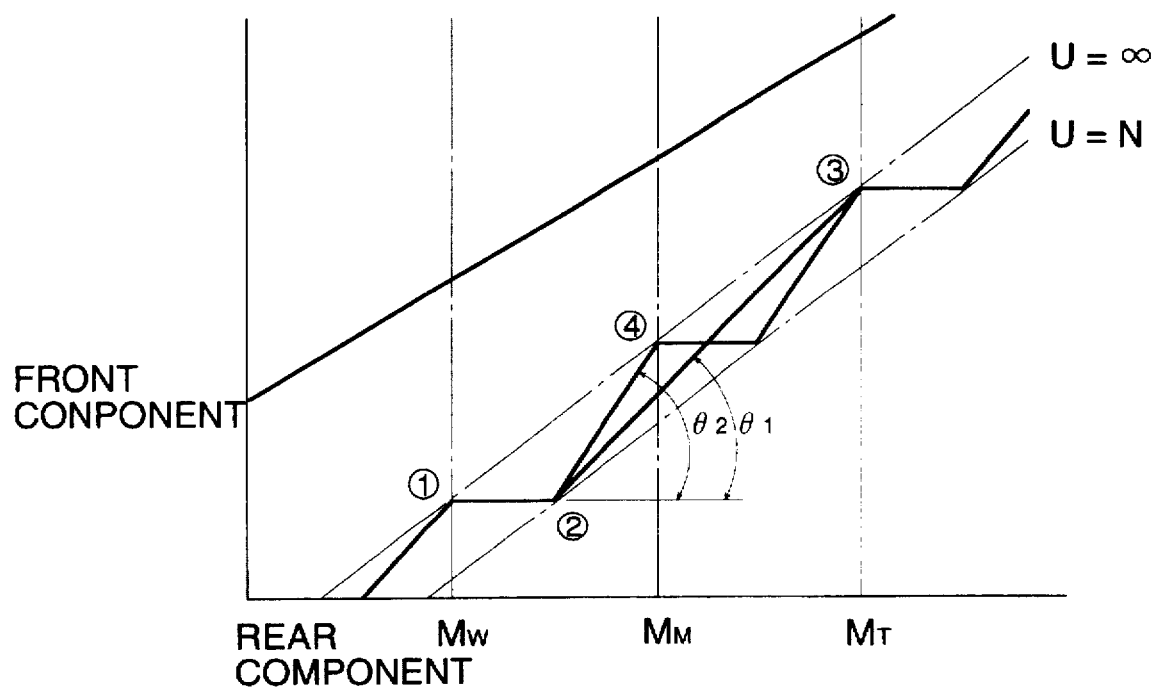
FIG. 2 is the magnified figure of zooming lines according to the conventional techniques.

Consequently, when the zooming lines of FIG. 7 are compared with those of FIG. 1 as conventional techniques, while there are four steps of focal lengths in FIG. 1, there are eight steps, which is increased (doubled) from the conventional techniques, of focal lengths in FIG. 7 of this example. However, the moving angle of the rear component does not become steeper than that of conventional techniques and smooth movement of the rear component can be performed.

In FIG. 7, the position of rear component lens 7 at the closest focal distance (N), which is moved from the position of W by focusing, is identical to the position of rear component lens 7 at the position of $M_1$, which is moved from the position of W by zooming; however, it is not necessary to make them identical. The case that the two positions are identical and the other case that they are not identical will be explained by referring FIGS. 8(A) and 8(B).

Figure 8:
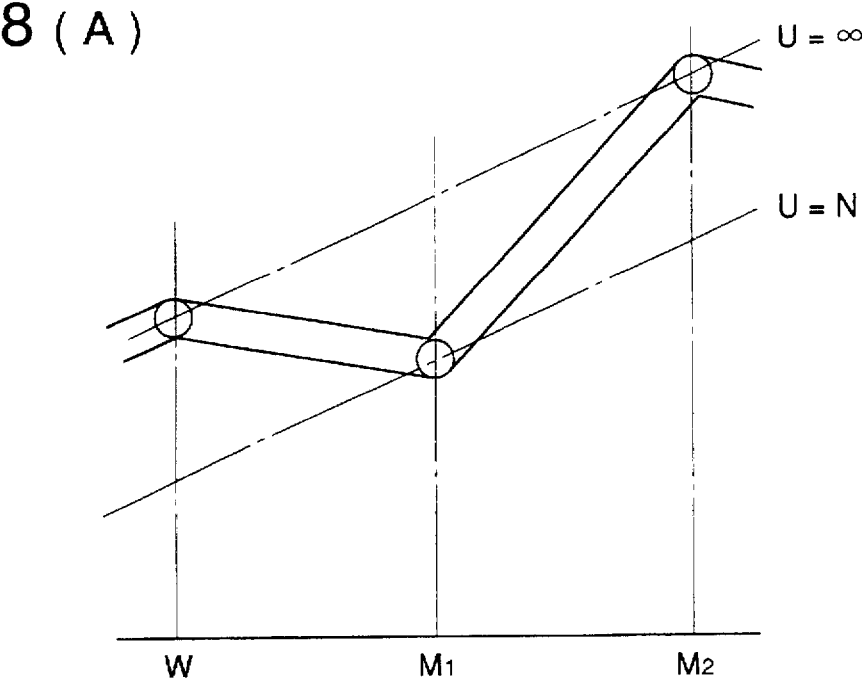
FIGS. 8(A) and 8(B) are the figures that lens movement by focusing and that by zooming are overlapped to each other, and the figure that they are not overlapped.
Figure 8:
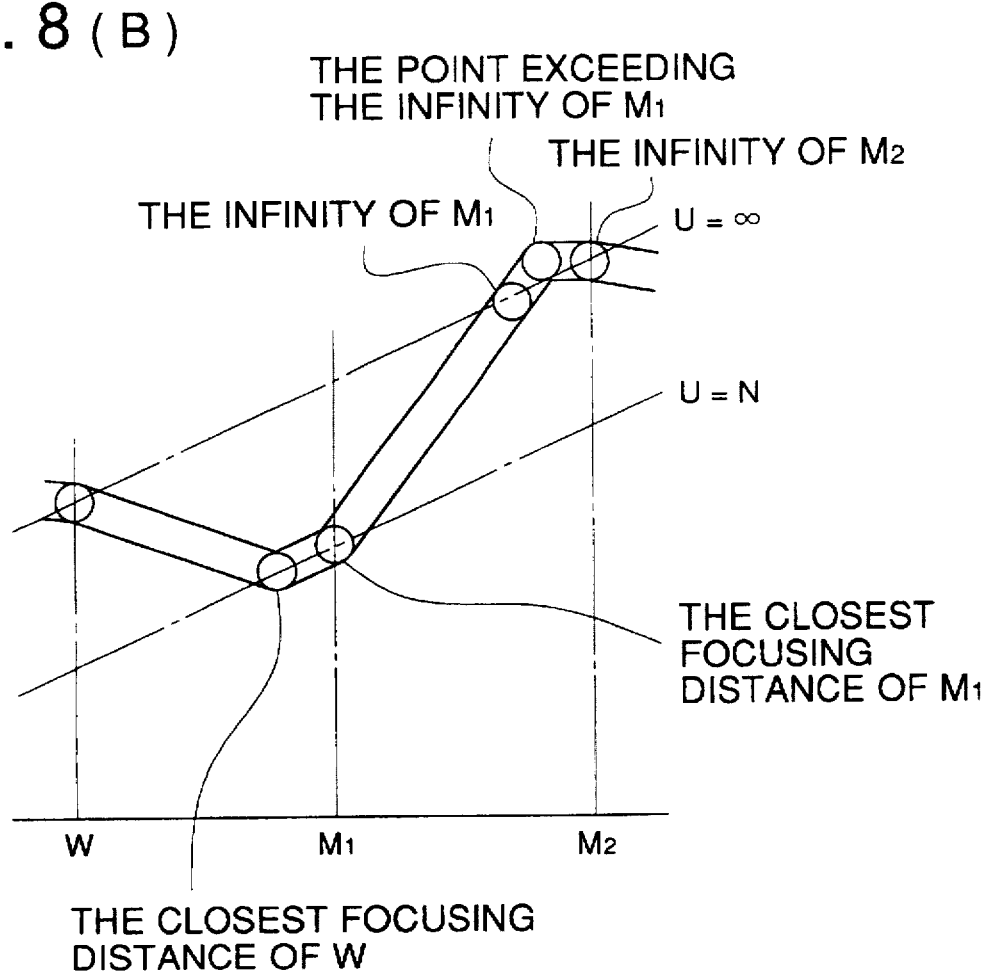

FIGS. 8(A) and 8(B) are the figures enlarging the cam shape of rear component lens 7 of FIG. 7 around $M_1$. FIG. 8(A) is the example that the position of rear component lens 7 at the closest focal distance (N), which is moved from the position of W by focusing, is identical to the position of rear component lens 7 at the position of $M_1$, which is moved from the position of W by zooming; and FIG. 8(B) is the example that the two positions are not identical.

It is obvious from the figures, the case in FIG. 8(B) realizes smooth cam curves; therefore, the mechanical stress at the lens movement can be less than that in the case of FIG. 8(A).

The facts explained above are also true in the positions of other focal lengths. Further, they are true in the example which will be explained hereinafter.

In the example of FIG. 7, focusing is available from the closest focal distance to infinity; however, it is not necessary to arrange focusing available from the closest focal distance to infinity. It is possible that the cam shape is designed to control lens movement so as to perform focusing within a limited distance.

Further, if the cam shape is designed to extend to the point exceeding the infinity position, which is fixed by the design reference of the lens, it becomes easier to compensate the discrepancy of focal point, which is created by the inconsistency of lens production, by using the extended portion as a cam for focal point adjustment. Therefore, in the example of the zoom lens barrel which is explained above, rear component lens 7 does not simply perform focusing and zooming but performs a focal point adjustment for picture-taking, which includes focusing and product dispersion compensation, and zooming. In other words, the zoom lens barrel of the present invention is capable of continuously performing the focal point adjustment between two different focal lengths by using the cam explained above.

Figure 9:
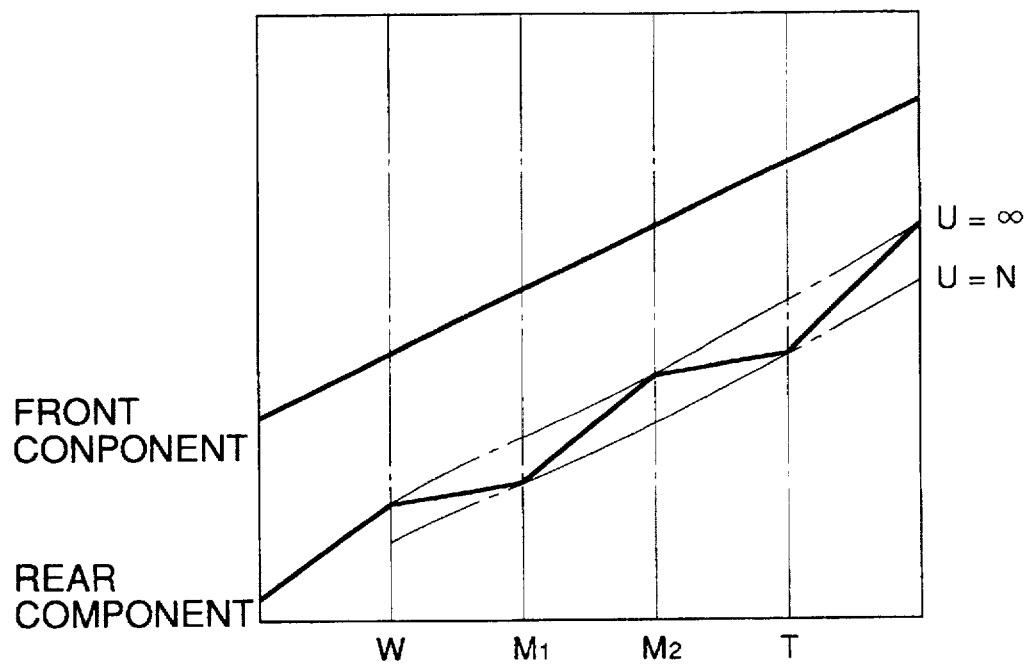
FIG. 9 is the figure of zooming lines which divides the range of the focal lengths to four steps.

FIG. 9 is the figure of zooming lines which divides the range of the focal lengths of FIG. 1 to four steps. However, the angle of the moving path of rear component is rather smoother than that of FIG. 1 because its configuration is the same as that of FIG. 7; therefore, cam barrel 2 can move smoothly.

The above-explained examples are zoom lenses which are configured to move two components of front and rear components. However, if a zoom lens is designed to have a high magnification ratio, it becomes necessary to have three components move. The figure of zooming lines of a zoom lens, which moves three components, will be explained hereinafter.

Figure 10:
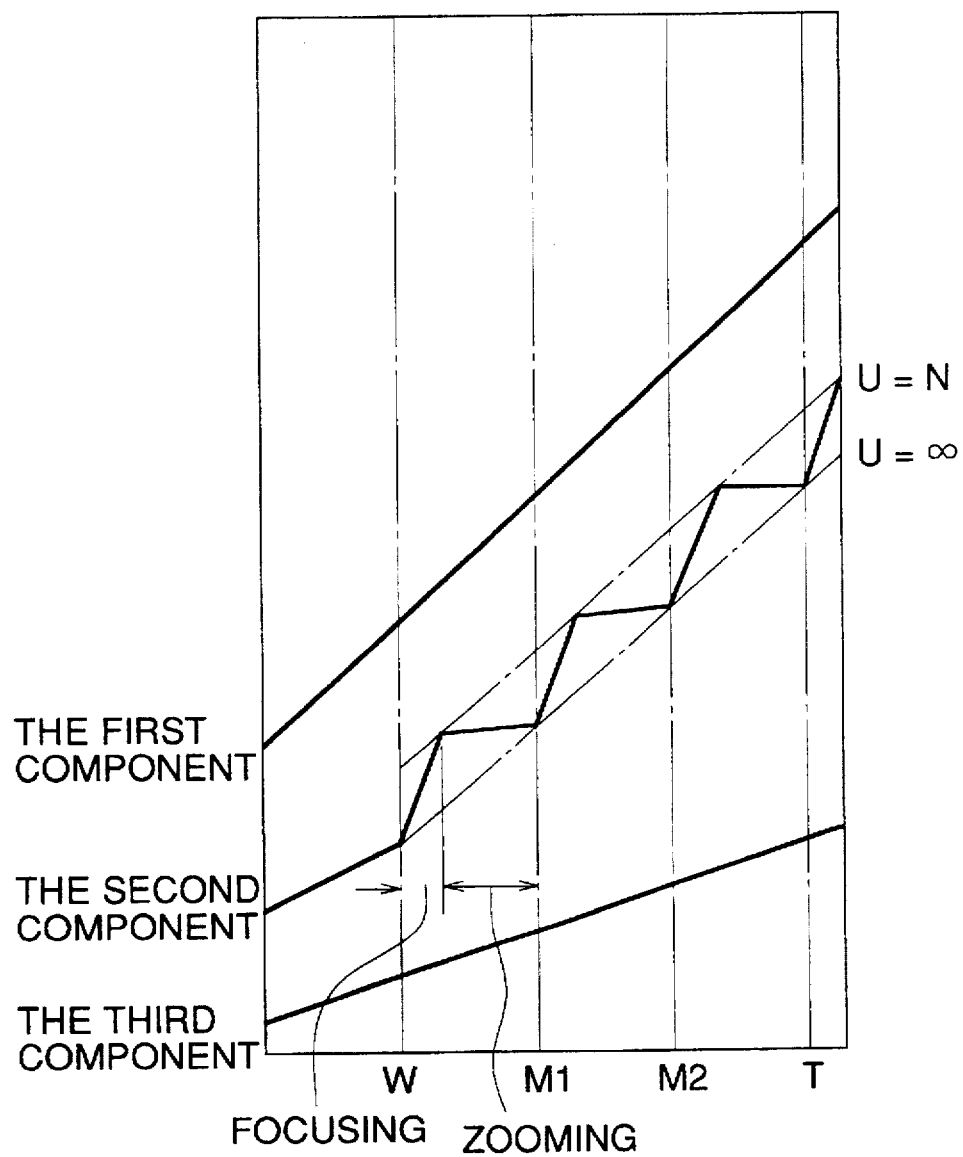
FIG. 10 is the figure of zooming lines of a zoom lens having three components in which the figure divides the range of the focal lengths of conventional techniques to four steps.

FIG. 10 is the figure of zooming lines which divides the range of the focal lengths, of conventional techniques such as in FIG. 1, to four steps. In FIG. 10, focusing portions and zooming portions are provided separately. However, as a difference from FIG. 1, FIG. 9 shows a zoom lens which moves three component lenses wherein the first and third components move linearly by the motions of helicoids each having respective leading angle, and the second component moves in a path of continuous wedges by a cam.

Figure 11:
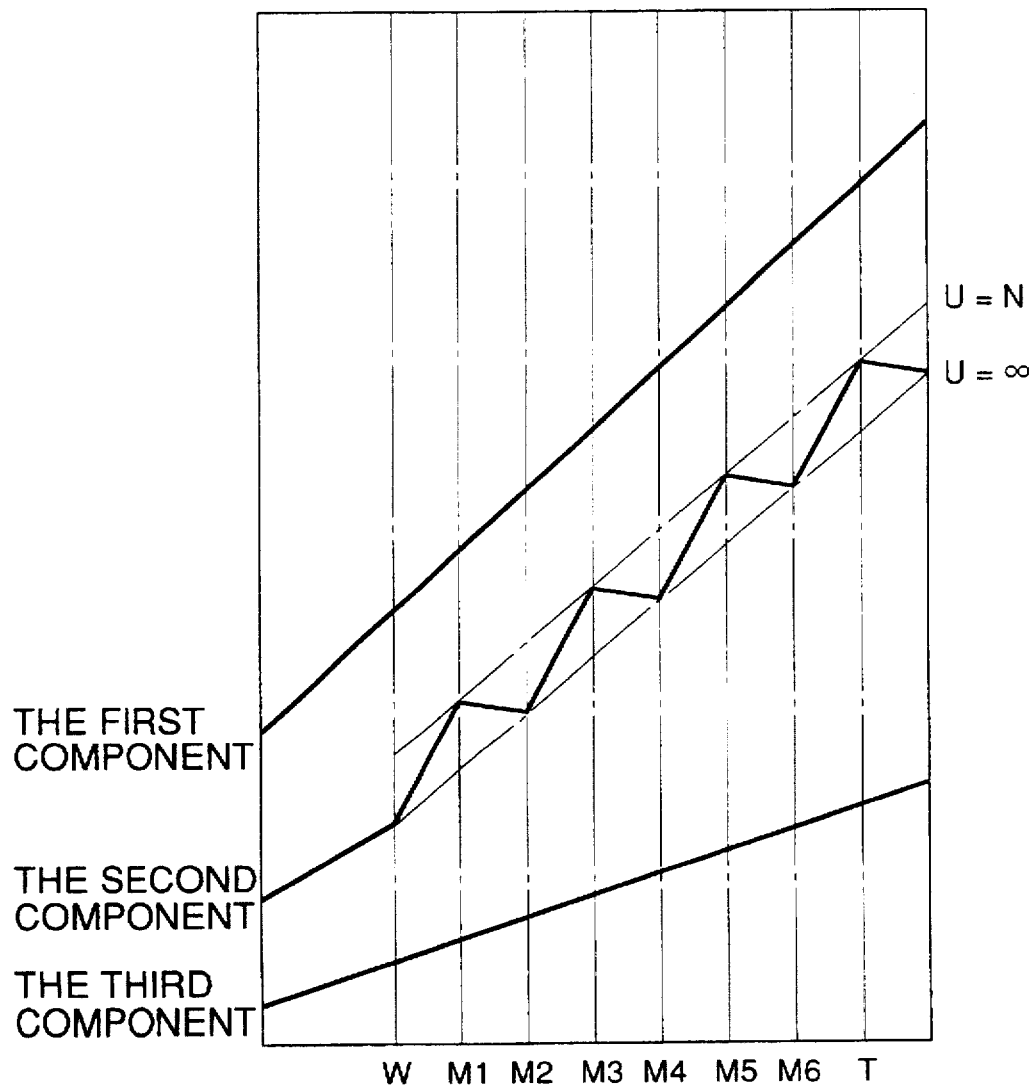
FIG. 11 is the figure of zooming lines of a zoom lens having three components in which the figure divides the range of the focal lengths to eight steps.

FIG. 11 is the figure of zooming lines of a zoom lens having three components in which focusing portions are provided in zooming portions. Although there are eight steps provided in the lines, the moving angle of the second component is almost the same as that of the second component moving in the zooming lines of four steps in FIG. 10 as explained above.

Figure 12:
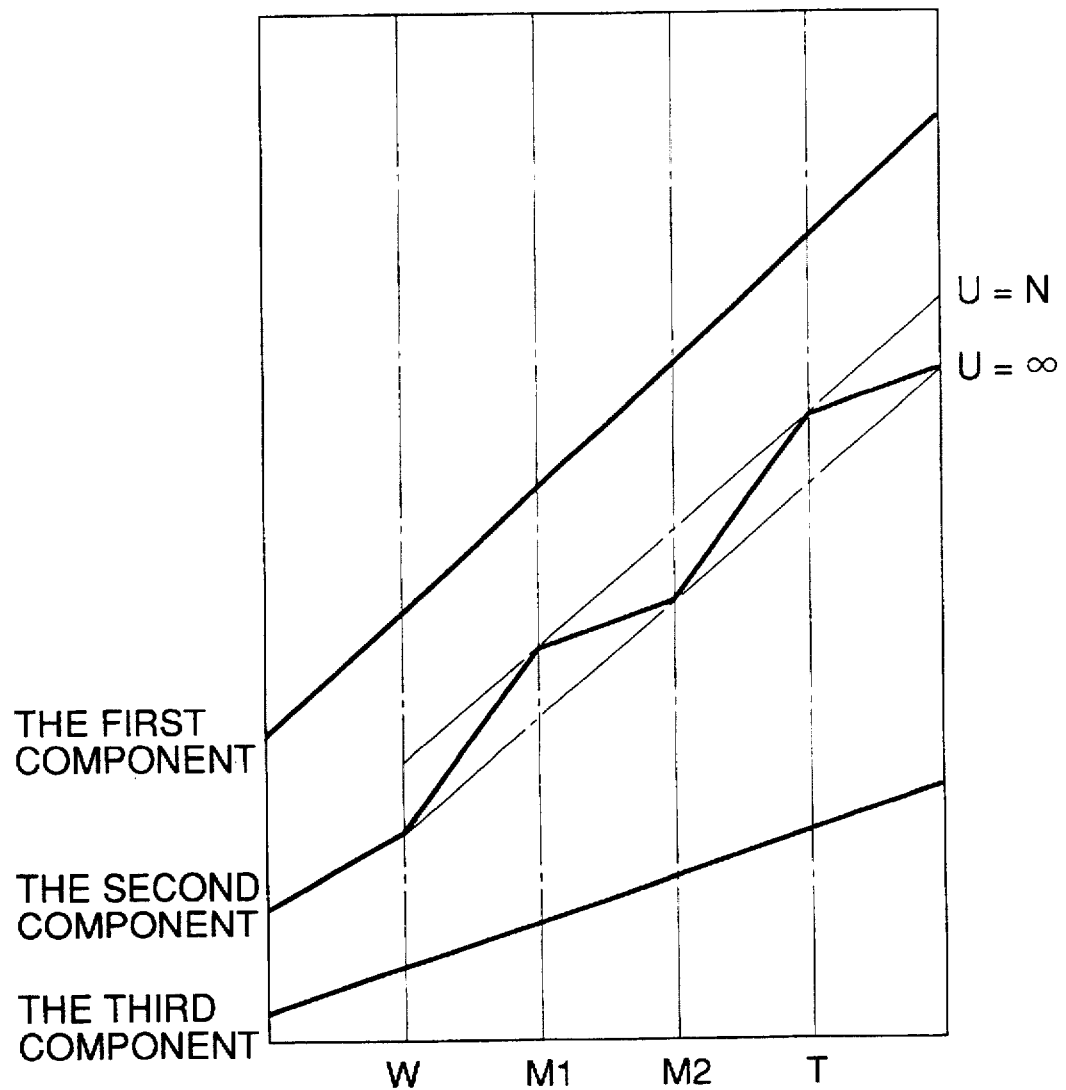
FIG. 12 is the figure of zooming lines of a zoom lens having three components in which the figure divides the range of the focal lengths to four steps.

Further, FIG. 12 is the figure of zooming lines which divides the focal lengths to four steps which is the same as that in FIG. 10. In FIG. 12, it is configured to set focusing portions are continuously provided in zooming portions; therefore, the moving angle of the second component is smoother than that of the second component in FIG. 10.

In FIGS. 11 and 12, the rear component moves in a wedge-shaped path in which the peak of the wedge corresponds to the closest focal distance and the ravine of the wedge corresponds to the infinity. However, it is also possible to configure the lens so that the peak corresponds to the infinity and the ravine corresponds to the closest focal distance.

Further, in the above-explained case of the zoom lens having three components, it is possible to configure the lens barrel as in the same manner of FIGS. 3 and 4. In other words, front component lens 5 and rear component lens 7 are supposed respectively as the first and second component lenses, the third component sliding frame for supporting the third component lens is arranged at the rear side of rear component sliding frame 6, the third component sliding frame is coupled with cam barrel 2 through helicoid portion which has a smaller leading angle than that of front component sliding frame 3, and the third component sliding frame is prevented from being rotated by linear guide 21.

Next, the relationship between the zoom lens barrel and the range finder in this example will be explained.

Figure 13:
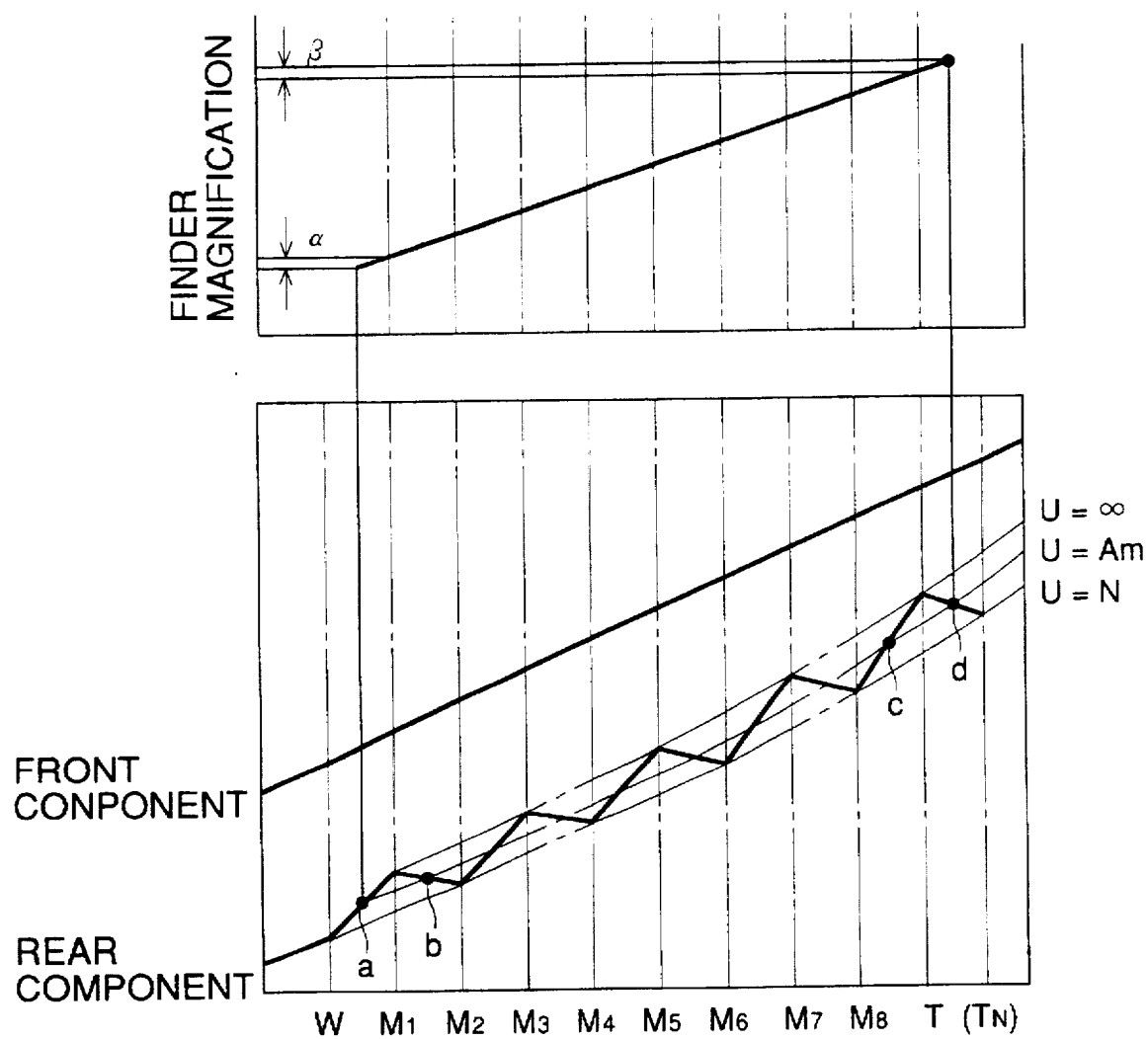
FIG. 13 is the figure of zooming lines having problems.

As explained above, in the step zooming method, the focal length of the lens varies step-wise; therefore, the magnification ratio of the range finder also varies step-wise. FIG. 13 shows one example of the method in which the relationship between the figure of zooming lines and the magnification change of the range finder is explained. In FIG. 13, the view angle of the range finder is set at that of distance A which is at the center between infinity (∞) and the closest focal distance (N). Therefore, the view angle of the range finder, when the focal length is set to W and release of the shutter is not yet executed, is set to that at position a. In the same manner, when it is set to $M_1$, the view angle is set to that at position b; when it is set to $M_8$, the view angle is set to that at position c; and when it is set to T, the view angle is set to that at position d.

However, there are problems in the figure of zooming lines such as FIG. 13. The problems will be explained hereinafter.

In FIG. 13, the minimum focal length W is set to make a focal point at the closest focal distance (N), and the maximum focal length T is set to make a focal point at infinity ($\infty$). When the value of the focal length is displayed on a camera or catalog, the focal length, which is measured at the infinite point as defined in JIS (Japanese Industrial Standard), is normally indicated. Therefore, the focal lengths between $M_1$ and T are indicated officially. However, the portion between W and $M_1$ and T and $T_N$ are also the ranges in use, and the cam barrel needs to be rotated more than the officially-indicated range of the focal lengths. The length of the cam barrel in its circumferential direction or its outer diameter needs to be formed long enough for the rotation.

Since the range finder is also in the same condition explained above as it is expected easily from FIG. 13, the range of magnification variation of the range finder needs to be wider for $\alpha$ and $\beta$ portions than that corresponding to the officially-written range of focal lengths. Therefore, the moving range of the range finder becomes large, the magnification ratio of the range finder becomes large, and it becomes difficult to assure a range finder performance. Further, the movement of magnification mechanisms of the range finder gains, mechanical loads gain, and the magnification mechanisms of the range finder becomes large.

Figure 14:
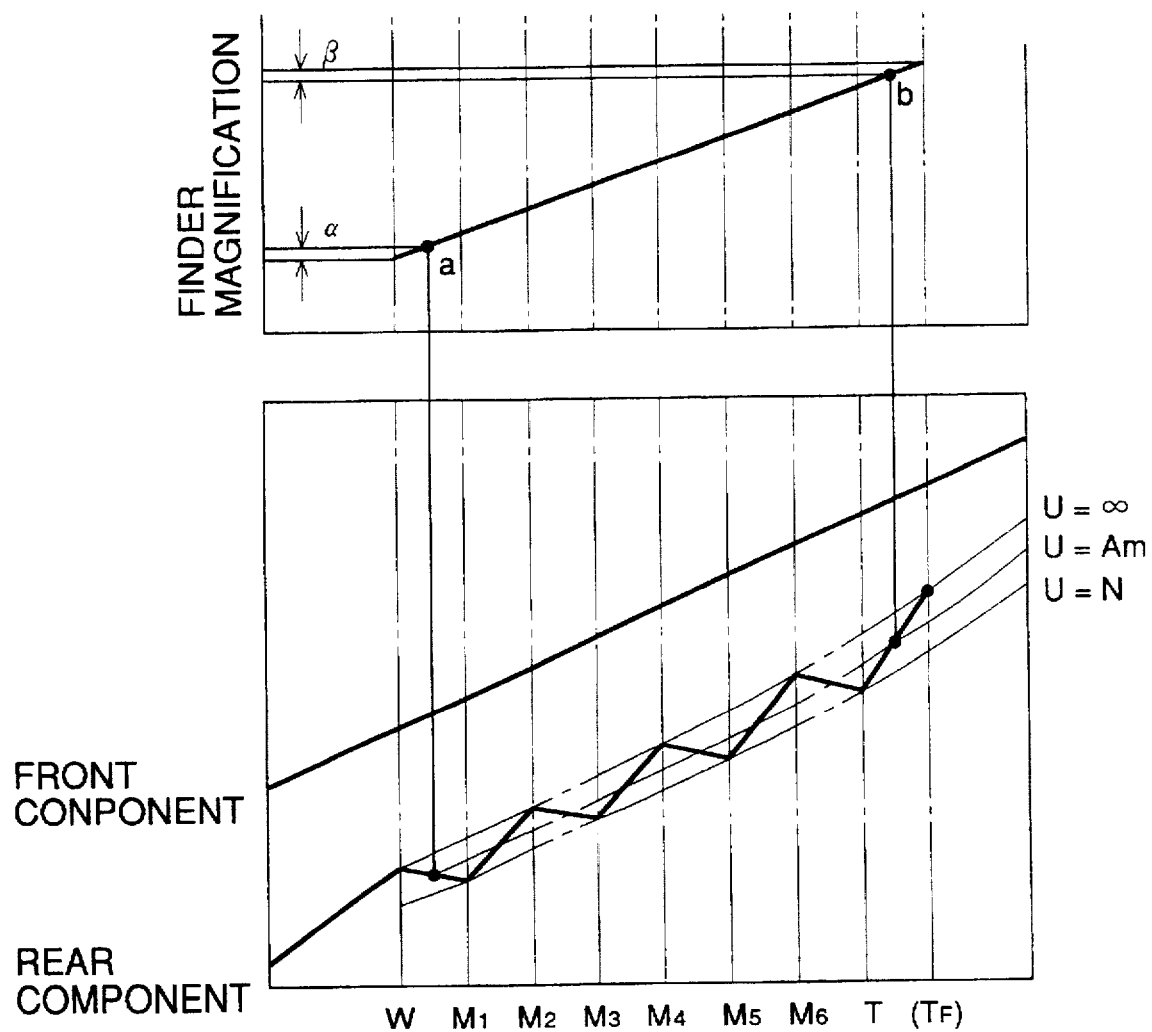
FIG. 14 is the ideal figure of zooming lines.

In order to solve the above problems, as shown in the figure of ideal zooming lines in FIG. 14, the position of the minimum focal length (W) of the zooming range is set to the infinity and the position of the maximum focal length (T) is set to the shortest focal distance. Of course, even one of the position of the minimum focal length or the position of the maximum focal length is set as above, the explained effects can be obtained.

By the settings explained above, the official indication of the focal length is shifted from W to $T_F$, the cam barrel can be configured to move in the range identical to that of the focal lengths of the official indication. If the range finder is designed to have a magnification variation between a and b, the range of the magnification variation can be set narrower for $\alpha$ and $\beta$ portions than that corresponding to the officially-written range of focal lengths.

According to the zoom lens barrel of the camera according to the present invention, even if the number of zooming steps is increased by using a high magnification ratio zoom lens, the angle of cam can be designed smooth so that mechanical load can be decreased without increasing the diameter of the lens barrel under the condition that the magnification ratio, the number of zooming steps, and the diameter of the lens barrel are the same as those of the lens barrel according to the conventional step zooming method.

Further, the magnification ratio of the range finder can be small, a range finder performance can be assured easily, and the movement of magnification mechanisms of the range finder can be minimized; therefore, the mechanical load of the magnification mechanisms can be minimized, and the size of the zoom lens barrel can be minimized.

Furthermore, focusing control can be simple and backlashes of cams and driving gears can be absorbed; therefore, the focusing precision can be enhanced.

What is claimed is:

1. A camera including a zoom lens having a plurality of focal lengths, said zoom lens comprising:

a first lens component;

a second lens component;

a lens barrel for guiding movement of said first lens component and said second lens component, the lens barrel including a first guide portion for guiding movement of said first lens component, and a second guide portion for guiding movement of said second lens component; and moving means for moving said first lens component along said first guide portion and for moving said second lens component along said second guide portion so that focal point adjustment is conducted continuously from a first one of said plurality of focal lengths to a second one of said plurality of focal lengths, said moving means moving said first lens component and said second lens component so that said camera performs a zooming operation from said first one of said plurality of focal lengths at a start of said zooming operation to said second one of said plurality of focal lengths at an end of said zooming operation.

2. The camera of claim 1, wherein a first position of said first lens component and said second lens component, corresponding to said start of said zooming operation, is an infinity position of said focal point adjustment in said first one of said plurality of focal lengths, and a second position of said first lens component and said second lens component, corresponding to said end of said zooming operation, is a closest focal distance to an object position of said focal point adjustment in said second one of said plurality of focal lengths.

3. The camera of claim 1, wherein a first position of said first lens component and said second lens component, corresponding to said start of said zooming operation, is a closest focal distance to an object position of said focal point adjustment in said first one of said plurality of focal lengths, and a second position of said first lens component and said second lens component, corresponding to said end of said zooming operation, is an infinity position of said focal point adjustment in said second one of said plurality of focal lengths.

4. The camera of claim 1, wherein one side end of said first guide portion and one side end of said second guide portion are positions of said focal point adjustment corresponding to an infinity position in a shortest focal length of said plurality of focal lengths, and wherein another side end of said first guide portion and another side end of said second guide portion are positions of said focal point adjustment corresponding to an infinity position in a longest focal length of said plurality of focal lengths.

5. The camera of claim 1, wherein one side end of said first guide portion and one side end of said second guide portion are positions of said focal point adjustment corresponding to an infinity position in a shortest focal length of said plurality of focal lengths, or wherein another side end of said first guide portion and another side end of said second guide portion are positions of said focal point adjustment corresponding to an infinity position in a longest focal length of said plurality of focal lengths.

6. The camera of claim 1, further comprising focusing restriction means for restricting moving directions of said first lens component and said second lens component, during said focal point adjustment at every focal length of said plurality of focal lengths, to only one direction.

* * * * *